United States Patent
Kinne et al.

(10) Patent No.: US 7,204,288 B2
(45) Date of Patent: *Apr. 17, 2007

(54) MULTI-BURNISH APPLICATOR FOR AND METHOD OF APPLYING A SHEET MATERIAL TO A SUBSTRATE

(75) Inventors: Daniel James Kinne, Cincinnati, OH (US); Mark John Steinhardt, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 18 days.

This patent is subject to a terminal disclaimer.

(21) Appl. No.: 10/700,614

(22) Filed: Nov. 4, 2003

(65) Prior Publication Data

US 2005/0092420 A1  May 5, 2005

Related U.S. Application Data

(63) Continuation-in-part of application No. 10/458,520, filed on Jun. 10, 2003, now Pat. No. 6,808,586.

(51) Int. Cl.
*B32B 39/00* (2006.01)
*B32B 37/00* (2006.01)

(52) U.S. Cl. .................. 156/574; 156/576; 156/583.8; 222/43; 222/80

(58) Field of Classification Search .................. 156/71, 156/184, 191, 459, 523, 577, 579, 581, 582, 156/574, 575, 391, 580, 583.8, 530; 15/235.3, 15/235.4, 235.7; 425/458; 16/374, 375, 16/385, 355; 222/43, 80, 83, 83.5, 89, 90, 222/245

See application file for complete search history.

(56) References Cited

U.S. PATENT DOCUMENTS

| | | | | |
|---|---|---|---|---|
| 3,907,628 A | * | 9/1975 | Buske | 156/574 |
| 3,969,181 A | | 7/1976 | Seabold | |
| 4,026,648 A | * | 5/1977 | Takahashi | 399/101 |
| 4,210,485 A | | 7/1980 | Lake | |
| 4,545,090 A | * | 10/1985 | Redmond | 16/385 |

(Continued)

FOREIGN PATENT DOCUMENTS

GB  967 405 A  8/1964
WO  WO 02/24468 A1  3/2002

OTHER PUBLICATIONS

Table of dates of Pre-Exposure of Decorate II Applicator, Nov. 5, 2003.

*Primary Examiner*—Chris Fiorilla
*Assistant Examiner*—Sing P. Chan
(74) *Attorney, Agent, or Firm*—Larry L. Huston; Jeffrey V. Bamber

(57) ABSTRACT

A method and applicator for applying sheet material to a substrate. The applicator comprises two outwardly facing burnishes, each having an outwardly facing surface. The surfaces are disposed at an included angle of at least 180°, and preferably at least 270°. This geometry allows for positioning sheet material, such as wallpaper, into a corner to begin application at a desired position. Further, this geometry allows the user to conveniently and ergonomically effectively rotate the applicator as the sheet material is being applied. The applicator and sheet material may be provided together in a kit.

12 Claims, 9 Drawing Sheets

U.S. PATENT DOCUMENTS

| | | |
|---|---|---|
| 4,711,682 A | 12/1987 | Barbe et al. |
| 4,806,184 A | 2/1989 | Shannon |
| 5,403,432 A | 4/1995 | Burch et al. |
| 5,442,832 A * | 8/1995 | Tonsager ................... 15/235.7 |
| 5,467,497 A * | 11/1995 | Greene et al. ............. 15/235.8 |
| 5,478,432 A | 12/1995 | Vester |
| 5,544,384 A * | 8/1996 | Forselius et al. .......... 15/235.7 |
| 5,759,270 A | 6/1998 | Lee |
| 6,059,002 A | 5/2000 | Katami |
| 6,450,231 B1 | 9/2002 | Ishikawa |
| 6,808,586 B1 * | 10/2004 | Steinhardt ................... 156/269 |

\* cited by examiner

MULTI-BURNISH APPLICATOR FOR AND METHOD OF APPLYING A SHEET MATERIAL TO A SUBSTRATE

CROSS REFERENCE TO RELATED APPLICATIONS

This application claims priority to and is a continuation in part of U.S. application Ser. No. 10/458,520, U.S. Pat. No. 6,808,586. filed Jun. 10, 2003.

FIELD OF INVENTION

This invention relates to an applicator for applying a sheet material to a substrate and a method of applying sheet material to a substrate.

BACKGROUND OF THE INVENTION

Sheet materials are common in everyday life. Examples of sheet materials include wallpaper, billboards, posters and advertisements, which are typically applied to vertical surfaces. Other examples include linoleum and other flooring, which are typically applied to horizontal surfaces. Sheet materials may be applied to other sheet materials, i.e., a lamina to make laminate materials. The laminate materials are then put to the end use. The substrate may also be portable as in the case of an open container or package.

Certain applications of a sheet material to a substrate present special problems. For example, applying wallpaper to a wall presents the problem of aligning the edge of the wallpaper against the ceiling or corner. Likewise, applying a poster to a backing may require similar alignment relative to a corner. Furthermore, there may be restrictions on the end of the sheet material to be cut from a roll, such as occurs when wallpaper meets the baseboard near the floor.

There have been several attempts in the art to conveniently apply a sheet material to a substrate. For example, U.S. Pat. Nos. 3,969,181, issued Jul. 13, 1976 to Seabold, and 4,806,184, issued Feb. 21, 1989 to Shannon, teach a transfer adhesive dispensing device and wallpaper applicator, respectively. However, each of these teachings use a single curved surface at the point of application onto the substrate. The curved surface makes it difficult to accommodate corners, etc., as described above.

Attempts to overcome the problems found with the curved surface occurring at the point of contact are found in U.S. Pat. Nos. 5,759,270, issued Jun. 2, 1998 to Lee; 6,059,002, issued May 9, 2000 to Katami; and 6,450,231 B1, issued Sep. 17, 2002 to Ishikawa. These references show a correction tape adhesiver, an application tool, and a film transfer apparatus, respectively. Each has an application point that comes to a knife edge. However, these teachings do not show how to burnish or otherwise apply the sheet material to the substrate so that it is applied in a smooth manner, relieving air bubbles, and ensuring conformance to the topography of the substrate.

An attempt to overcome these disadvantages are found in U.S. Pat. No. 5,478,432, issued Dec. 26, 1995 to Vester. Vester teaches a wallpaper border applicator having a spool receiver assembly offset from a base assembly. The offset provides an ergonomically inefficient design, and makes precise location of the wallpaper difficult to achieve.

An attempt to overcome this disadvantage is found in U.S. Pat. No. 4,711,682, issued Dec. 8, 1987, to Barbe et al. Barbe teaches a wallpaper applicator for applying wallpaper in a single continuous stroke. However, Barbe does not deal with the problems of securely and accurately placing wallpaper in the corner near the ceiling.

Accordingly, there is a need in the art for a sheet material applicator and method of applying sheet materials which simultaneously provides for precise placement of the sheet material in a corner and/or at the end of the run. Additionally, there is a need in the art for a sheet material applicator and method which simultaneously burnishes the sheet material during application.

SUMMARY OF THE INVENTION

The invention comprises an applicator for applying a sheet material to a substrate. The applicator comprises at least two burnishes. Each of the two burnishes has a surface for burnishing the sheet material. The burnishes are disposed so that the first surfaces subtend an included angle of at least 180°, and preferably at least 270°. In one embodiment, the first surfaces subtend an angle of 270°.

The invention also comprises a method of applying a sheet material to a substrate. The method comprises the steps of providing an applicator usable for dispensing a sheet material onto the substrate. The applicator has two burnishes, each burnish having a first outwardly facing surface for burnishing the sheet material onto the substrate. The burnishes subtend an included angle of at least 180°. The invention comprises the steps of loading a sheet material into the applicator and placing a first burnish against the substrate. The applicator is then moved in an application direction whereby the sheet material is applied to the substrate. The first surface of the first burnish burnishes the sheet material onto the substrate. The applicator is rotated to engage the second burnish with the sheet material. Moving of the applicator in the application direction continues to thereby burnish the sheet material with the first surface of the second burnish.

BRIEF DESCRIPTION OF THE DRAWINGS

FIGS. 3A–9 are schematic profile views of the first surfaces of the applicator of FIG. 2 showing various alternative configurations and having the corner of the substrate designated by dashed lines, with FIGS. 3A–3C showing applicators having chamfered surfaces at the vertex; with FIG. 3A showing an applicator having three first surfaces;

FIG. 9 showing an applicator having an extendible control bar in the deployed configuration, the control bar being deployable from any of positions A–D.

DETAILED DESCRIPTION OF THE INVENTION

Figure 1A:
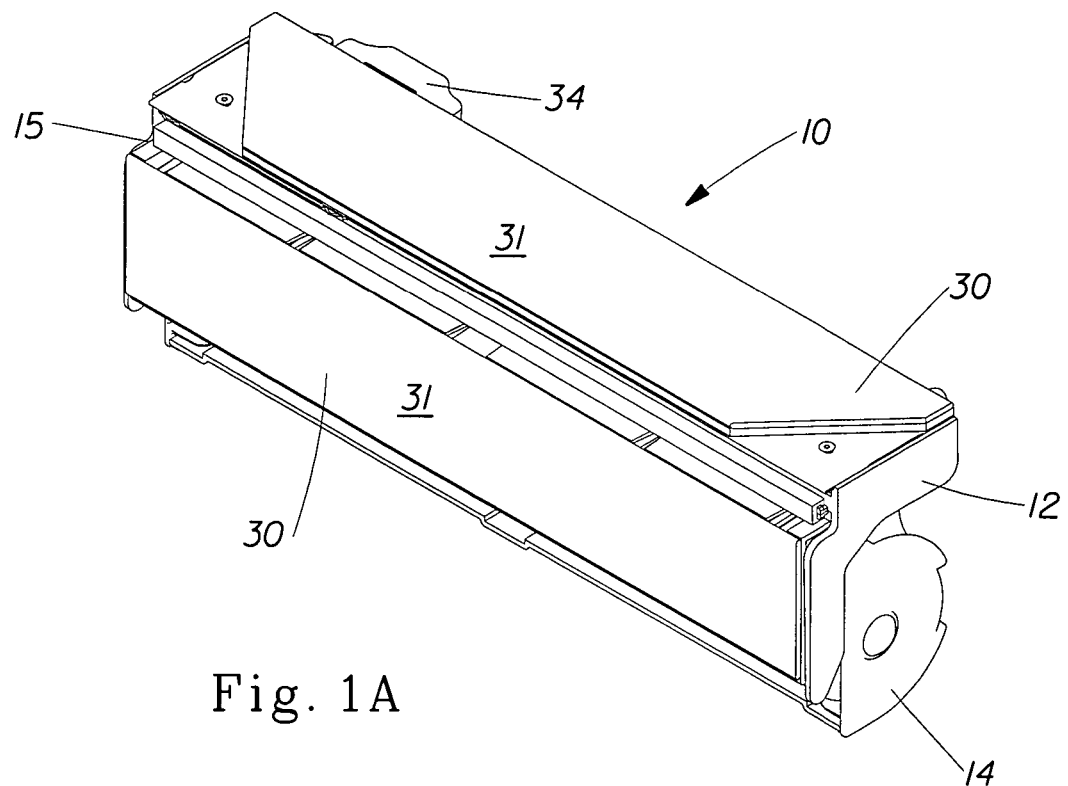
FIGS. 1A–1B are perspective views of an applicator according to the present invention, omitting the sheet material for clarity.
Figure 1B:
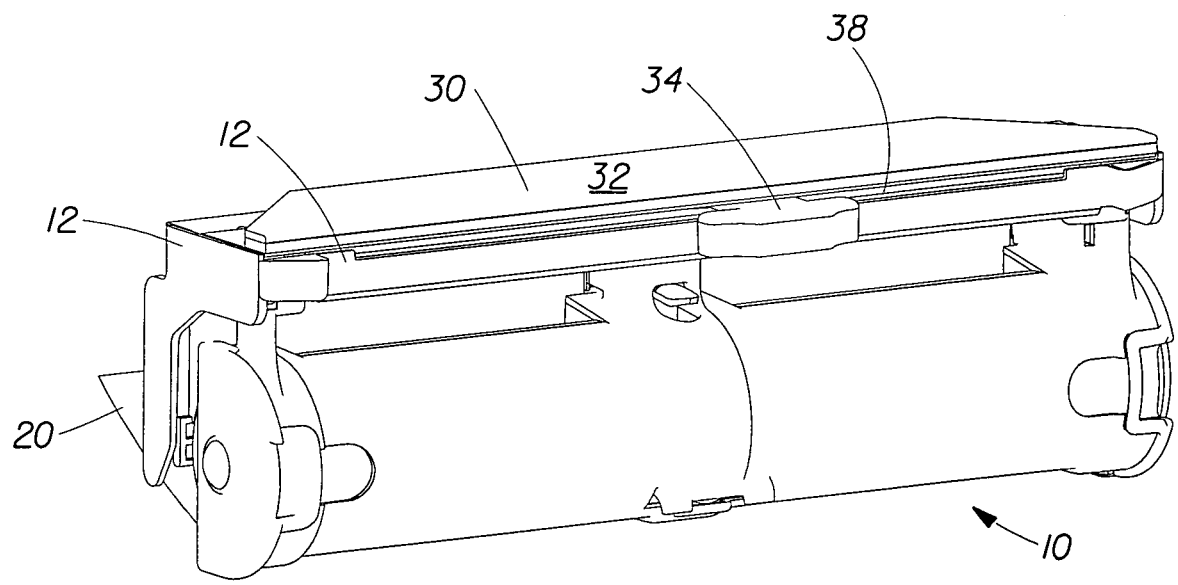

Referring to FIGS. 1A–1B, the invention comprises an applicator 10 for applying a sheet material 20 to a substrate. The substrate may be stationary or portable, reusable or disposable, as desired. The substrate may be a product or material 20 adapted for its final use, such as a wall, floor, window, bowl, open container, or billboard. Alternatively, the substrate may be an intermediate, such as one or more laminae of a laminate. The substrate may be flat, rectilinear, curvilinear, rigid or flexible, of regular or irregular shape, size and/or texture, as desired.

The sheet material 20 may comprise wallpaper, wrapping paper, film, a protective layer, food covering, paper, non-woven, architectural adhesive films, visually or tactilely perceptible indicia, labels, tape, transfer adhesive, etc. The material 20 may provide decorative and/or functional benefits, including but not limited to insulating and protective functionality.

The material 20 may be supplied in the form of a volute spool, such as a spiral wound roll, as is known in the art and as further discussed herein. The sheet material 20 may be wound onto a core, or wound without a core, as desired. A spool of such material 20 may be rotatably mounted in the applicator 10. However, it is to be recognized that a quantity of the sheet material 20 may include one or more discrete or continuous flat or folded sheets of material 20 inserted into the applicator 10.

The material 20 has a width, taken parallel to the major axis of the spool, and a length, taken parallel to the direction of application of the sheet material 20 onto the substrate. The material 20 further has a thickness, which may be any thickness sufficient to allow for bending of the material 20 during the application process and which provides the desired functionality in use. Preferably the material 20 has thickness of 0.076 mm or less.

The material 20 to be applied has a free end. The free end of the material 20 is the portion of the material 20 which is distal relative to the applicator 10 and is typically the first portion of the material 20 to be applied to the substrate during a given application. The material 20 is removably mounted into the applicator 10. The material 20 may be dispensed until depleted by application to the substrate or, alternatively, may be removed when it is desired to apply the same or a different material 20 to the same or different substrate.

The applicator 10 may be stationary or portable, as desired. Preferably, the applicator 10 is portable, so that it can conveniently apply sheet materials 20 in a desired pattern with minimal set-up. Sheet material 20 may be manually applied from the applicator 10, may be dispensed using a drive motor, and/or may be applied automatically using robotic systems as is known in the art.

The applicator 10 is generally elongate, and has a major axis parallel to the width of the material 20 to be applied and the major axis of a spool of sheet material 20 inserted into the holder 14. The length of the applicator 10, taken along the major axis, should be great enough to accommodate any desired width of material 20 to be applied. It is to be recognized that the material 20 may be of significantly lesser width than the length of the applicator 10 and that multiple sheets of material 20, each having a width less than the length of the applicator 10, may be simultaneously applied in parallel or sequentially applied in series. If such an arrangement is selected, the materials 20 may be simultaneously or serially applied to the substrate, and the materials 20 may be the same or different, as desired.

The applicator 10 according to the present invention may comprise a frame 12 and a holder 14. The frame 12 and the holder 14 may be movable relative to one another. Either the frame 12 or the holder 14 may move, while the other is held stationary or each may move relative to the other. The holder 14 comprises any device suitable for holding the material 20 to be applied to the substrate immediately prior to its application. The holder 14 may be elongate and completely or partially enclose the material 20 to protect it from dirt or other contamination between applications and during storage. However, it is not necessary that the material 20 be covered at all. The holder 14 further may comprise one or more rotatable mountings for a spool of the sheet material 20. The rotatable mountings may include trunnions, journals, bearings, a central axle, etc., all of which are known in the art for mounting a spool of sheet material 20 to a holder 14.

Two rotatable mountings may be included, one at each end of the holder 14. If desired, the two rotatable mountings may be coupled together with gears, etc., to improve tracking of the applicator 10 as it applies the material 20. If desired, the rotatable mountings may be loaded or biased to provide braking action, so that the material 20 is not applied too quickly and mistakes are minimized. If the braking action is strong enough, the applicator 10 and material 20 may hang on the wall for a brief period of time, allowing the user to reposition, gather other tools, etc.

The applicator 10 according to the present invention may also comprise a control bar 15. The control bar 15 is preferably elongate, parallel to the major axis of the holder 14, and may be mounted on the frame 12. The control bar 15 engages and disengages the sheet material 20, and preferably the free end of the sheet material 20 or a portion of the sheet material 20 juxtaposed therewith. Preferably the control bar 15 has a length equal to or greater than the width of the sheet material 20. The control bar 15 may have vacuum, adhesive, a coating which is cohesive with the sheet material 20 to be applied, hook and loop fasteners, or other coatings which are suitable for contacting, gripping or otherwise engaging the sheet material 20 to be applied. The coatings, vacuum, etc., may be durable or replaceable as desired. Further, the coatings or vacuum may be continuously or discontinuously applied across the length of the control bar 15 and hence across the width of the sheet material 20.

If a geometry having generally perpendicularly oriented burnishes 30 is selected, as illustrated herein, care should be taken that the control bar 15 does not improperly engage the sheet material 20 as it is applied to the substrate. To prevent this from occurring, a portion of the control bar 15 may be provided without adhesive. This may be accomplished by displacing the control bar 15 slightly towards the spool of material 20, as shown.

Figure 2:
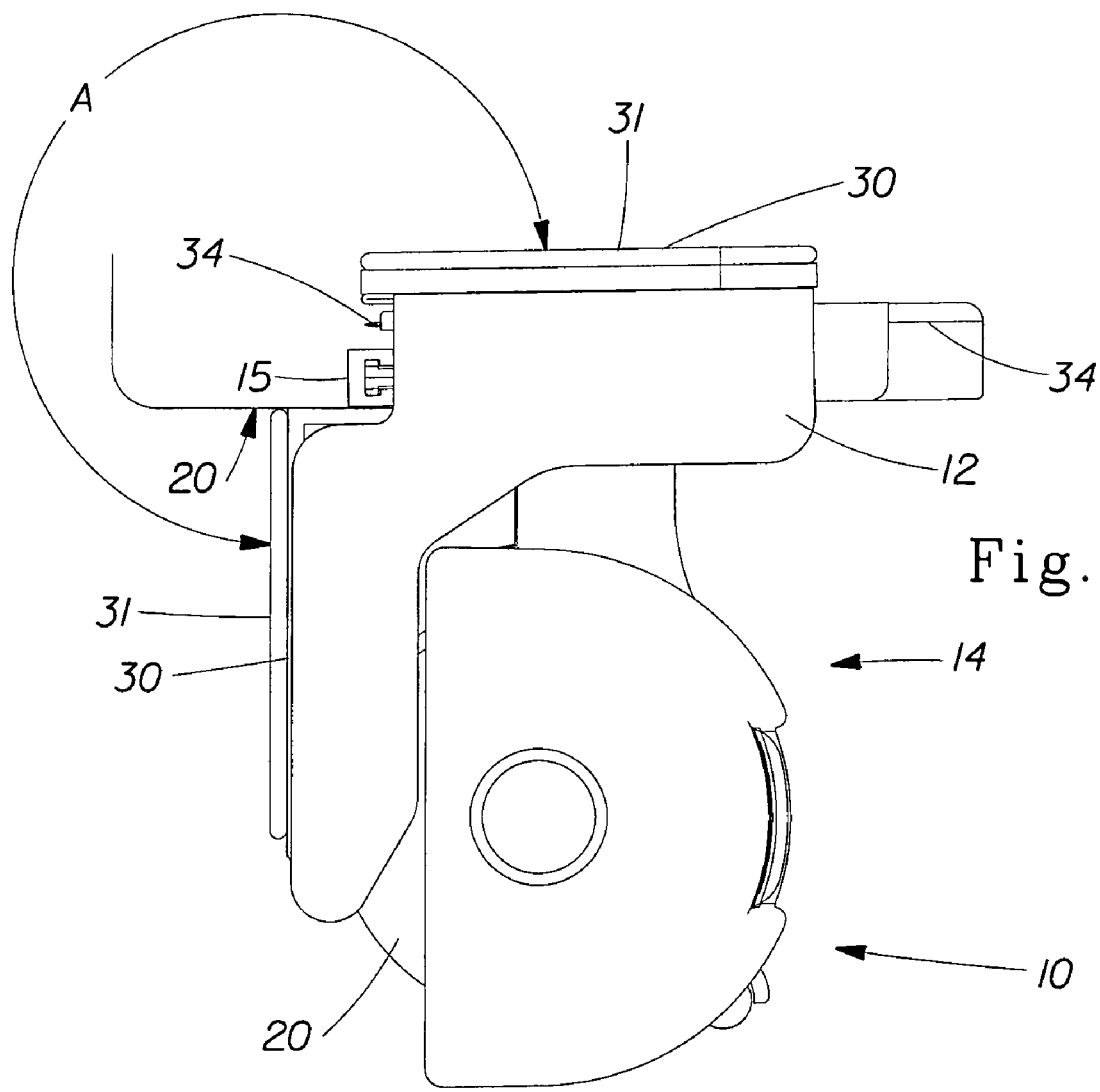
FIG. 2 is a profile view of the applicator of FIGS. 1A–1B.

Referring to FIG. 2, the applicator 10 is provided with at least one burnish 30. The burnish 30 may be disposed on the frame 12, the holder 14 or both. The applicator 10 may have two or more separate burnishes 30 independently mounted or mounted on a common portion of the applicator 10.

A burnish 30 is any surface or surfaces of the applicator 10 which provides for smoothing of the sheet material 20 when it is applied to the substrate, further presses the sheet material 20 and substrate together, removes air bubbles, and/or further ensures good engagement of the sheet material 20 and substrate without wrinkling, undue folds or misalignment due to stretching, etc. The burnish 30 may comprise any material which is compliant and preferably resilient, so that the sheet material 20 may be applied to and burnished to the substrate as described above. Suitable burnishes include, without limitation, felt, rubber pads, hard plastic and sponge materials. The burnish 30 may be flat, convex, concave or of other curvilinear configurations as desired by the user and dictated by the end use.

Each burnish 30 has a first surface 31 and may also have a second surface opposed thereto. The first surface 31 is outwardly oriented and suitable for contacting and burnishing the sheet material 20 onto the substrate. The second surface is inwardly oriented and may have any configuration and geometry suitable for use with the applicator 10.

If more than one burnish 30 is provided, the burnishes 30 may comprise different first surfaces 31. For example, a coarse first surface 31 may be used to assist with the initial application of the sheet material 20 to the substrate, a fine first surface 31 may be used to later assist in the application, etc.

The first surfaces 31 of the burnishes 30 may be disposed at least 180° apart, and preferably at least 270° apart. The first surfaces 31 may be disposed 270° apart as shown by angle A, may be disposed 270 –290° apart, or may be disposed in any other suitable orientation as described herein. The included angle A is determined between the first surfaces 31 of the burnishes 30 as follows. If each of the first surfaces 31 of the burnishes 30 is flat, the included angle A is determined from simple geometry.

Referring to FIGS. 3A–9, it is to be recognized that either or both of the first surfaces 31 of the burnishes 30 may be irregular, offset, arcuate or curvilinear. If one or more of the first surfaces 31 of the burnishes 30 is not flat, parallel to the major axis, the effective included angle A between the surfaces may be qualitatively determined as follows.

A right angle block is provided. The right angle block has a perpendicular inside corner, formed between two flat, straight and rigid surfaces. The right angle block is disposed so that one leg is vertically oriented and one leg is horizontally oriented. The horizontal leg is disposed above the vertical leg, such that an inside corner between a wall and ceiling is represented.

The applicator 10 is disposed in the corner formed by the right angle block. The applicator 10 is oriented in its intended position for use, with one first surface 31 of one burnish 30 contacting the vertical leg of the right angle block and the other first surface 31 of the burnish 30 facing towards the horizontal leg. If at least an operable portion of each first surface 31 of the burnishes 30 can simultaneously contact or be contained within both legs of the right angle block, the included angle A is considered to be at least 270°. By "operable portion," it is meant that enough of the first surface 31 is in contact with the leg to effectively burnish or assist in applying the sheet material 20 to the substrate. Generally, it is to be understood that an operable portion of the first surface 31 denotes more than tangent line contact taken perpendicular to the direction of application of the sheet material 20 onto the substrate.

It will be apparent to one of skill that the first surfaces 31 of the burnishes 30 may intersect, or be extrapolated to intersect, at a vertex 32. It will be understood that the first burnish 30 and the second burnish 30 may be, but need not be, equally angularly offset from the vertex 32.

In any case, it is desirable that the vertex 32 of the applicator 10 be juxtaposable with, and preferably be able to be placed coincident with, the corner of the right angle block. This capability allows placement of the sheet material 20 in any desired position as may occur. Particularly, this capability allows the free edge of the sheet material 20 to be placed in the corner between a wall and a ceiling as is typically desired when applying wallpaper, posters, etc.

Generally speaking, there are many configurations of burnishes 30 which are suitable for use with the present invention. It is only important that the first surfaces 31 of the burnishes 30 be disposed in non-coplanar relationship and form a convex relationship therebetween. Further, in addition to maintaining the convex non-coplanar relationship between first surfaces 31, it is desirable that one of the first surfaces 31 be juxtaposable with, and more preferably disposable coincident to a corner. This allows precise placement of the free end of the sheet material 20 into a corner, such as occurs between a wall and ceiling.

Figure 3A:
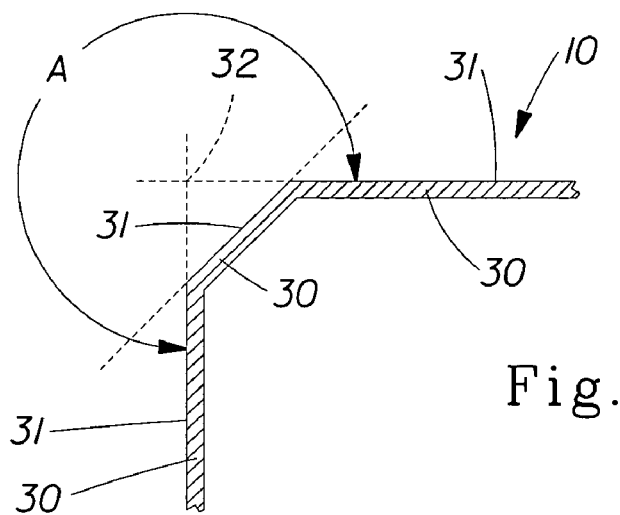
Figure 3B:
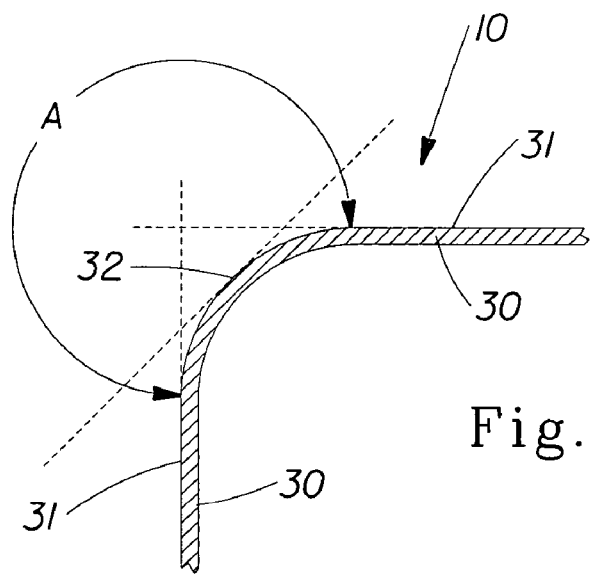
Figure 3C:
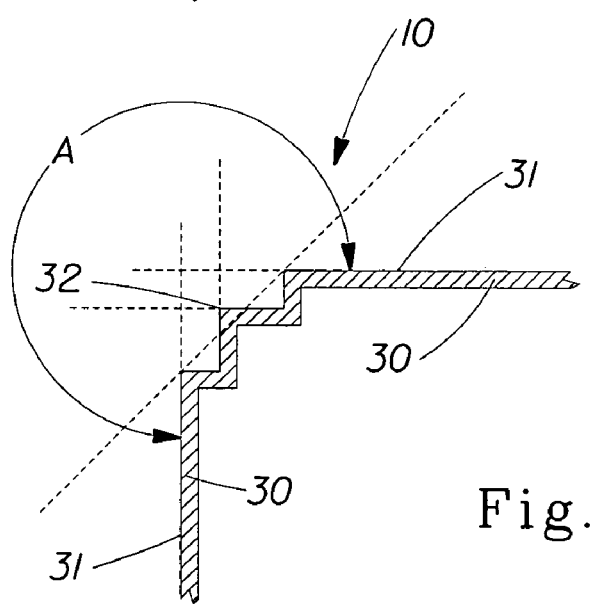

Referring to FIGS. 3A–3C, schematic side views of first surfaces 31 of an applicator 10 are shown. The applicator 10 of FIG. 3 has a chamfered or beveled surface juxtaposed with the vertex 32. This arrangement allows the applicator 10 to fit into a corner, but does not reach the precise vertex 32 of the corner. Accordingly, alternative means may be required to place the sheet material 20 into the corner defined by the substrate. FIG. 3B provides a similar geometry, with a rounded chamfer. FIG. 3C shows one of any number of stepped chamfers which could be selected by the user. The chamfers provide the benefit that the recess provided in the chamfer may be used for various functionalities relating to the applicator 10, sheet material 20, or combinations thereof.

Figure 4A:
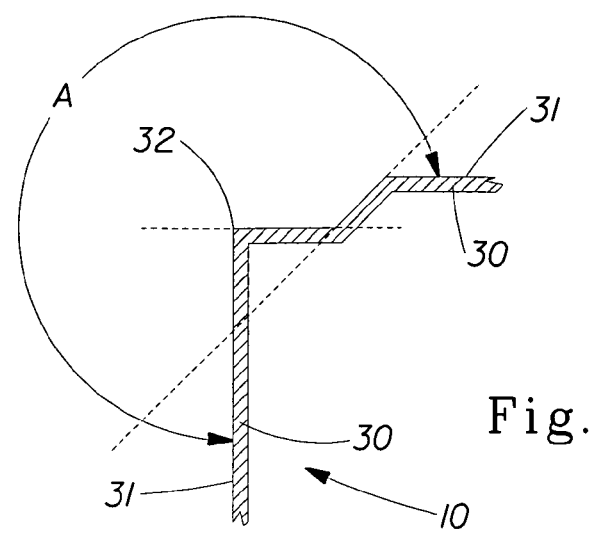
FIGS. 4A–4C showing applicators having offsets at the vertex.
Figure 4B:
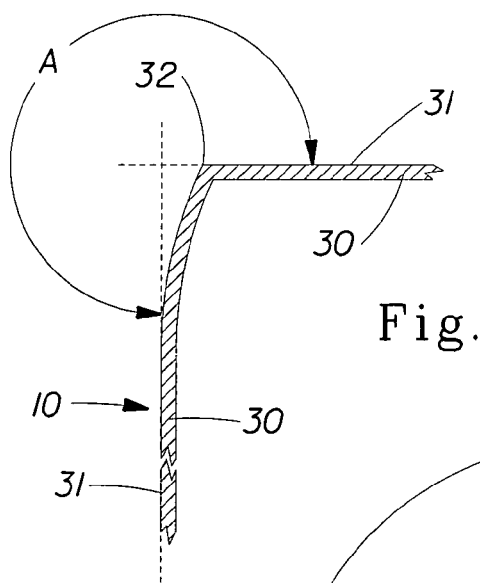
Figure 4C:
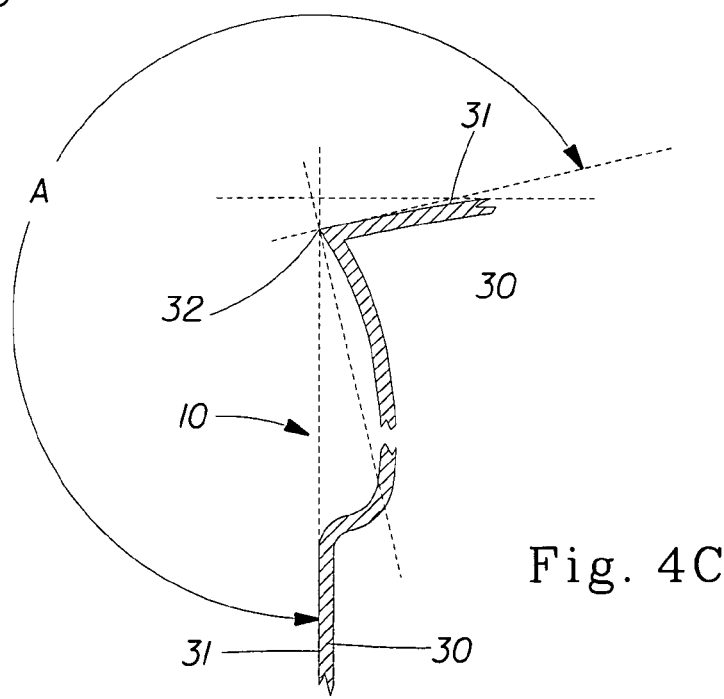

FIGS. 4A–4C show applicators 10 having various offsets at the vertex 32. FIG. 4A shows an applicator 10 having a step-wise transition at one of the first surfaces 31. The step-wise transition allows for burnishing against the first surface 31 or the edge of the first surface 31 closer to the vertex 32. FIG. 4B shows an applicator 10 having a convex first surface 31. FIG. 4C shows an applicator 10 having convex and concave first surfaces 31. Of course, one of skill will recognize that the configurations of the first surfaces 31 need not be limited to those shown, but instead could be transposed from the first surfaces 31 of the applicator 10 as shown, or provided in any desired hybrid fashion. Such offsets again provide the benefit that functionality relating to the applicator 10 or sheet material 20 may be incorporated therein.

Figure 5A:
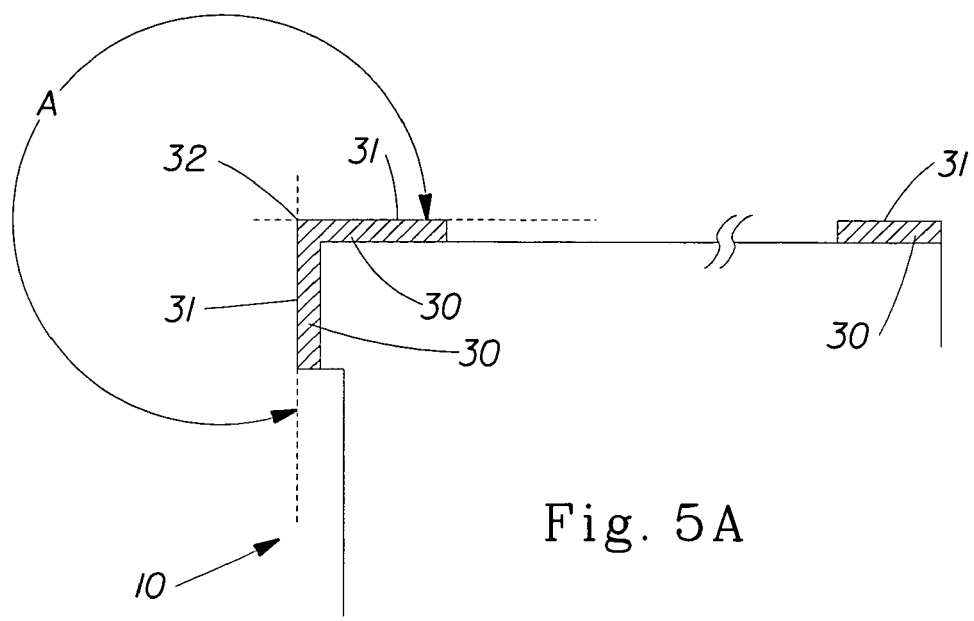
FIGS. 5A–5B showing applicators having protrusions at the vertex.
Figure 5B:
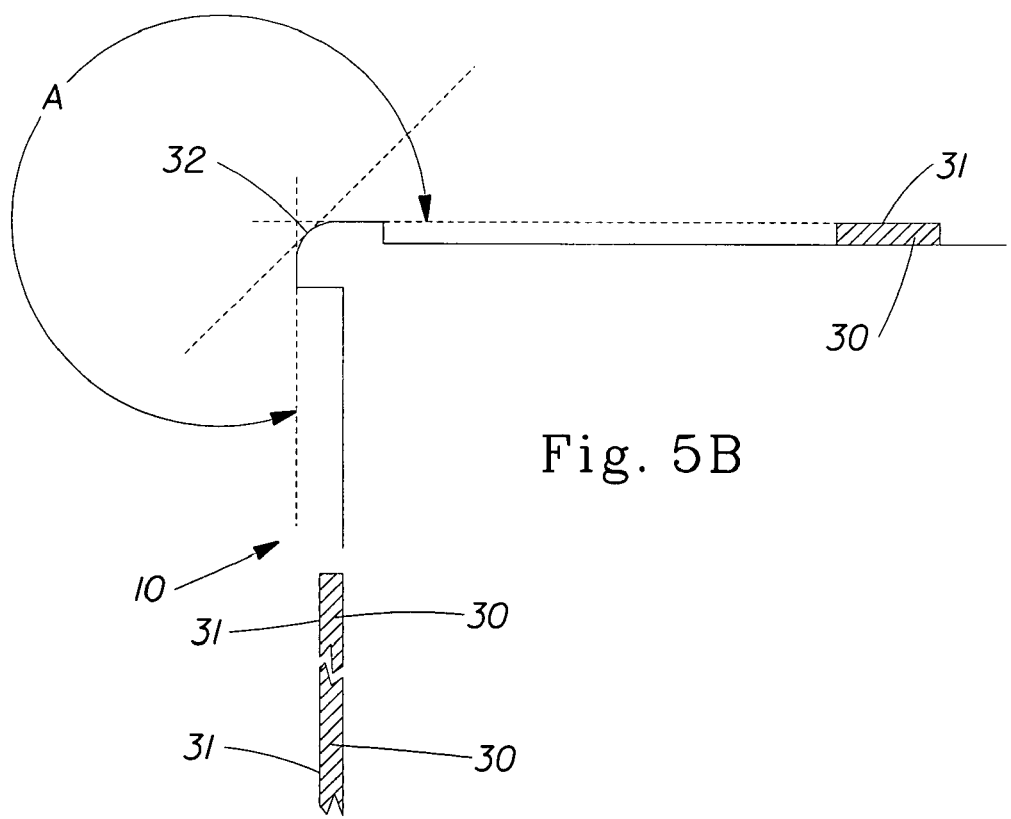

FIGS. 5A–5B show applicators 10 having protrusions at the vertex 32. FIG. 5A illustrates an applicator 10 having first surfaces 31 which are generally equivalent in length as taken from the vertex 32 and are disposed approximately 270 degrees apart. Optionally, the first surface 31 aligned in the horizontal plane may have protrusions disposed away from the corner defined by the substrate. FIG. 5B illustrates an applicator 10 having a rounded protrusion at the vertex 32 and again an optional protrusion spaced on the vertically oriented first surface 31. The embodiments of FIGS. 5A–5B provide the benefit that irregularities or asperities in the substrate do not prevent the vertex 32 of the applicator 10 from fully reaching into or near the corner formed by the substrate.

Figure 6A:
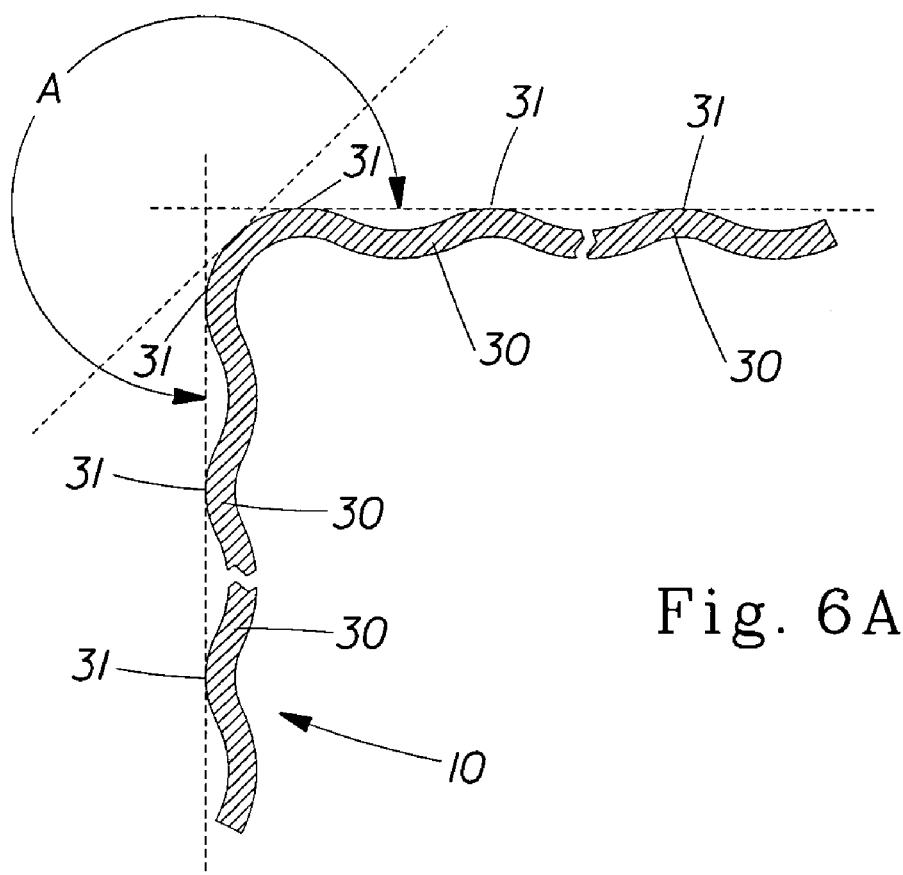
FIGS. 6A–6B showing applicators having irregular first surfaces.
Figure 6B:
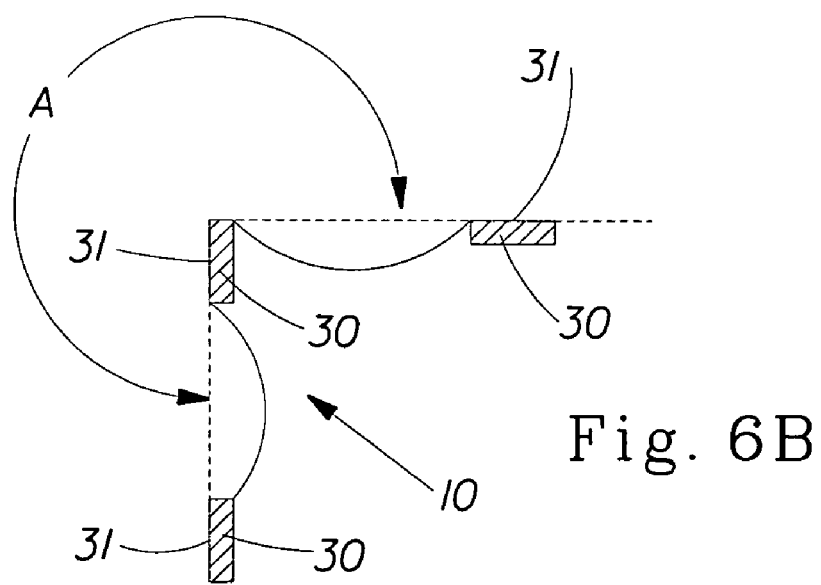

FIGS. 6A–6B illustrate applicators 10 having irregular surfaces. Irregular surfaces provide multiple points of contact during the burnishing operation. Multiple points of contact allow for smoothing and releasing of the sheet material 20 during application to the substrate FIG. 6B shows an applicator 10 having two first surfaces 31 on each of the vertical and horizontal burnishes 30. It is to be recognized that any or all of these first surfaces 31 may be spring biased towards the substrate.

Figure 7A:
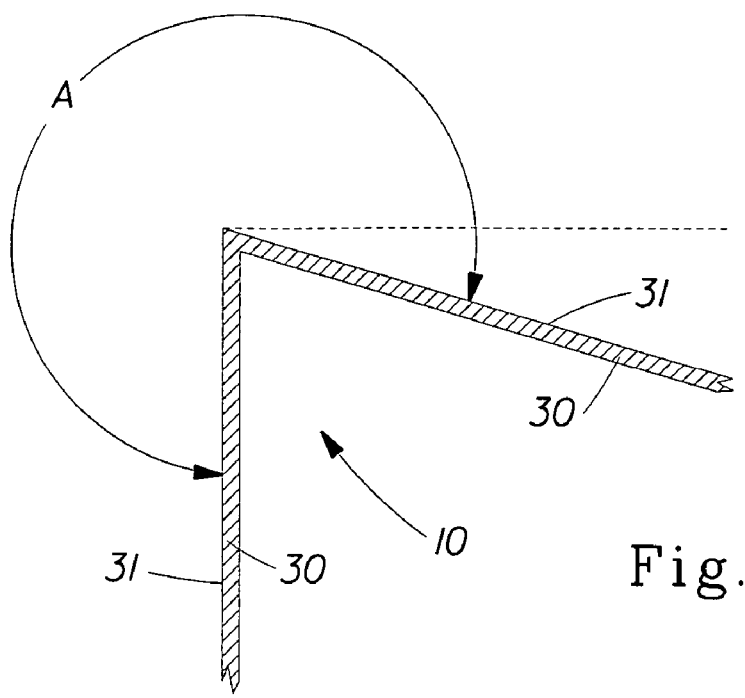
FIGS. 7A–7B showing applicators having first surfaces which subtend angles greater than 270 degrees.
Figure 7B:
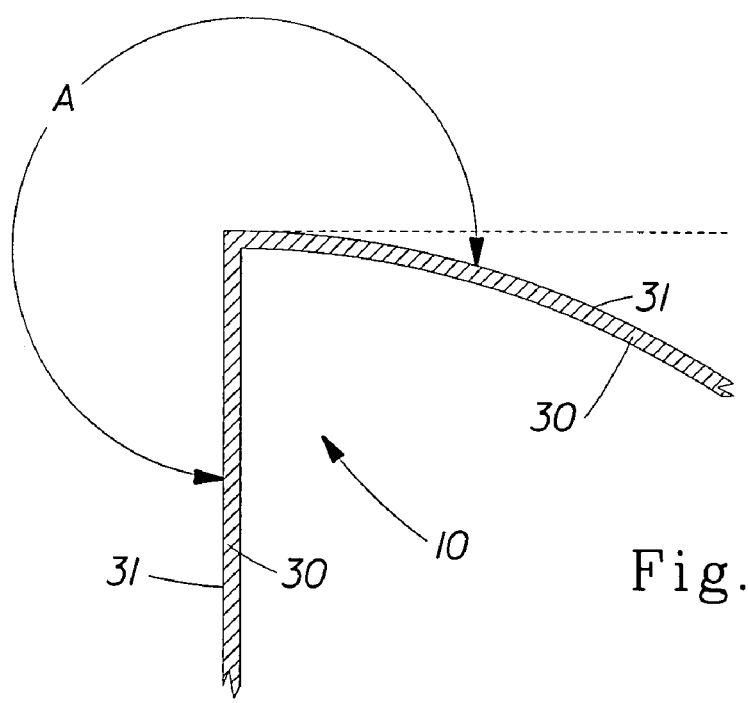

FIGS. 7A–7B show applicators 10 having first surfaces 31 subtending an angle greater than 270 degrees. While FIGS.

7A–7B show first surfaces 31 disposed in the vertical plane and contacting a vertically oriented substrate, the invention is not so limited. The first surfaces 31 of FIGS. 7A and 7B could be transposed or, alternatively, may be hybrids of rectilinear and curvilinear surfaces. This arrangement provides the advantage that the vertex 32 of the applicator 10 can reach into the corner of the substrate even if forms a slightly acute angle.

One of skill will recognize that the applicator 10 may be moved in a direction parallel to the major axis of the holder 14, rather than perpendicular thereto as previously described. If the applicator 10 is moved parallel to the major axis, it may be disposed at an inside corner, so that one first surface 31 of each burnish 30 may simultaneously contact the two legs of the substrate forming the corner.

Figure 8A:
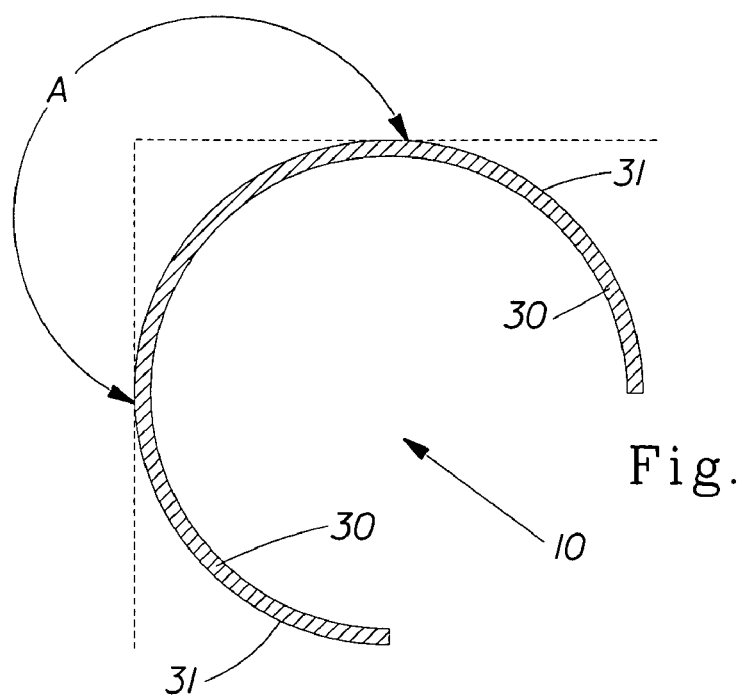
FIGS. 8A–8B showing applicators having a curvilinear first surface; with the applicator of FIG. 8B having first surfaces articulable relative to each other.
Figure 8B:
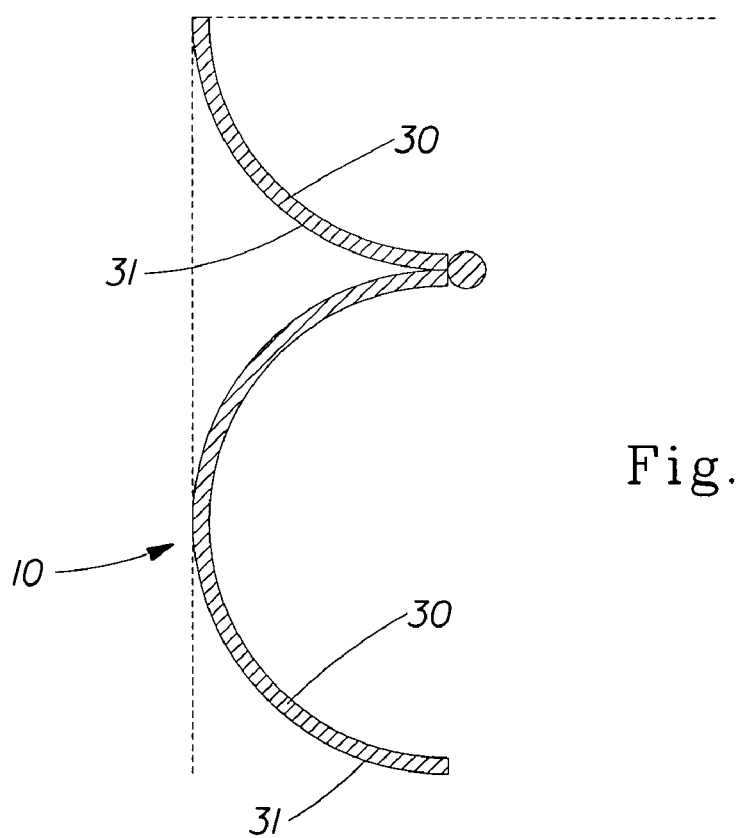

FIGS. 8A–8B show an alternative execution wherein the applicator 10 has a curvilinear first surface 31. The embodiment of FIG. 8A shows an applicator 10 having a first surface 31 which remains in constant position relative to itself at the point of use. The applicator 10 may be rolled about its major axis as the burnish 30 applies the sheet material 20 to the substrate during application. Such an embodiment effectively has two burnishes 30, one contacting each leg of the substrate. FIG. 8B shows an applicator 10 having an articulable hinge parallel to the major axis of the applicator 10. The articulable hinge allows either or both of the burnishes 30 to move relative to the other burnish 30. This arrangement provides the benefit that one first surface 31 can be placed against the wall, and the other burnish 30 articulated to intercept the corner formed by the substrate. This arrangement allows for deployment of the sheet material 20 into the corner. It will be apparent to one of skill that in an alternative execution the articulated burnish 30 may be concave outward rather than concave inward, as illustrated by FIG. 8B. This embodiment provides the benefit that the edge of the burnish 30 may also intercept the corner formed by the substrate at yet a different angle. Of course either burnish 30 may be articulated relative to the other in these embodiments, compound curvilinear shapes may be utilized, and the size and radii of curvature of the burnishes 30 need not be equal.

Figure 9:
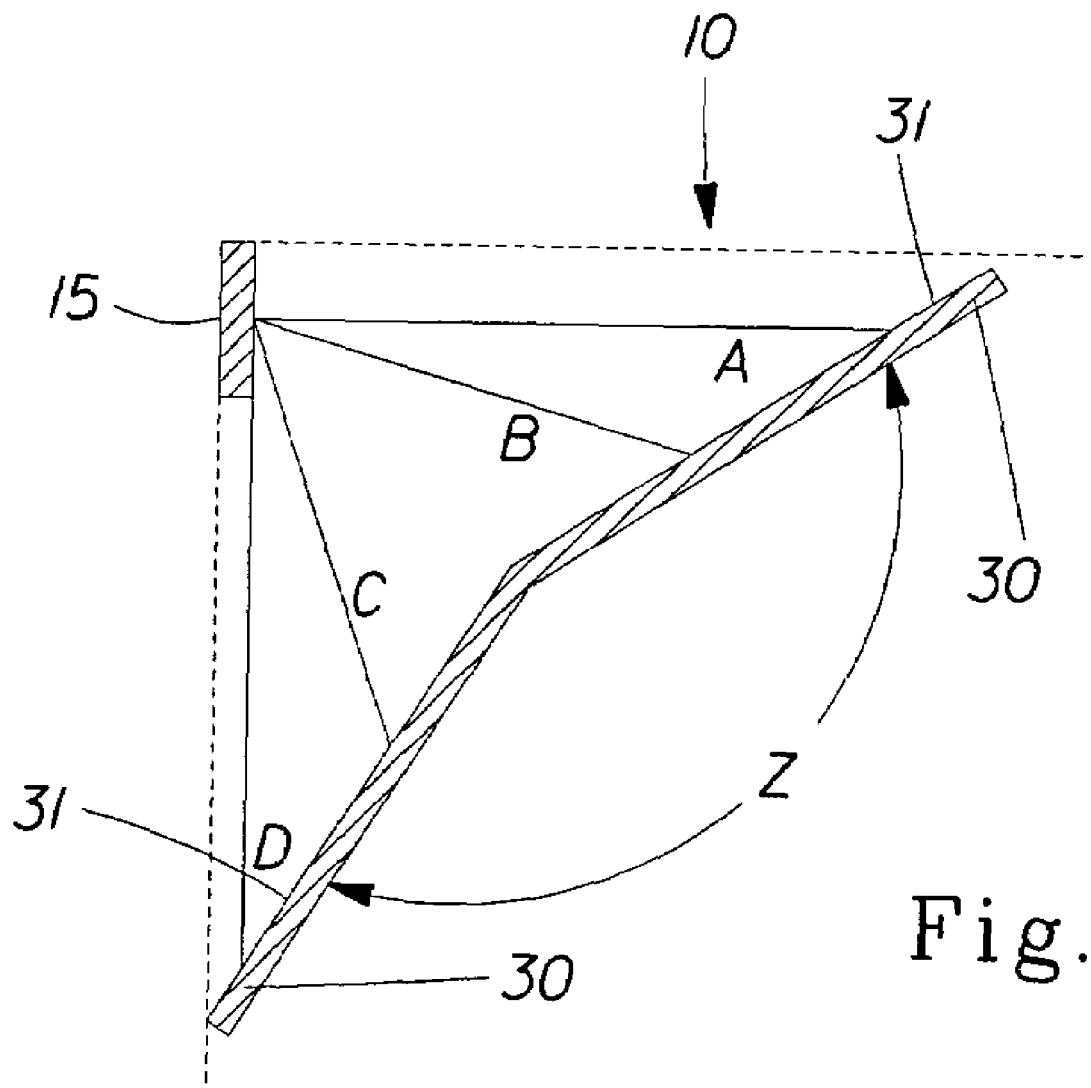

FIG. 9 shows an applicator 10 having an extendible and retractable control bar 15. The control bar 15 is moved between a retracted position and a deployed position. In the deployed position, the first surfaces 31 of the applicator 10 need not reach into the corner formed by the substrate. Instead, the control bar 15 may be deployed to the extended position whereby the control bar 15 is juxtaposed with the corner formed by the substrate. The control bar 15 may be deployed and retracted along tracks, by pivoting, etc., as is well known in the art. The first surfaces 31 of the applicator 10 may be of equal or unequal length and/or width. The burnishes 30 of the applicator 10 may be fixed or articulable about angle X.

In operation, it is desirable that the first surfaces 31 of the burnishes 30 contact the sheet material 20 and burnish it onto the substrate in a particular order. While either burnish 30 can be used to first contact and burnish the sheet material 20, preferably the first burnish 30 used to apply the sheet material 20 to the substrate is the burnish 30 vertically oriented as shown in the figures. Typically, the user applies sheet materials 20 to a substrate in a vertical direction. This allows the balance of the sheet material 20 to hang under the influence of gravity immediately prior to application.

If desired, the first surfaces 31 of the burnishes 30 may be compliant, rather than rigid. By compliant it is meant that the first surfaces 31 are flexible and can conform to the shape of a curved or irregular substrate. This provides the advantage that sheet materials 20 may be applied to a greater variety of substrates.

As the applicator 10 applies the sheet material 20 to a vertical surface, the user moves the applicator 10 in the downward direction. At some point, it becomes ergonomically undesirable to maintain the applicator 10 in the position illustrated in the figures. At this point, the user will roll the applicator 10 from the first burnish 30 to the second burnish 30. Preferably, the user rolls the applicator 10 about its major axis in an overhand motion, while the applicator 10 moves to a lower position on a vertical surface. Likewise, the user can rotate the applicator 10 about its major axis in an overhand motion as it is pulled towards the user on a horizontal surface. Conversely, the user may wish to rotate the applicator 10 about its major axis in an underhand motion as it is pushed away from the user, particularly on a horizontal surface. Of course, there may be configurations suited to overhand and underhand rotation in combination.

The applicator 10 may comprise a generally cylindrical holder 14, conveniently grasped by the user. The holder 14 may be nested in the included angle formed between two separate burnishes 30. If the user applies the substrate to a vertical surface and starts at the top of the surface, as the applicator 10 approaches the bottom of the substrate, the user may conveniently roll the applicator 10 forward from the first burnish 30 to the second burnish 30. This provides an ergonomically efficient design, allowing the user to maintain accurate positioning of the applicator 10 as it applies the material 20 to various heights of the substrate.

It has been found that there is a relationship between the width of the sheet material 20 and the preferred length of the burnish 30, the length of the burnish 30 being taken in the direction of application of and parallel to the length of the sheet material 20. As the sheet material 20 becomes wider, the length of the burnish 30 in the direction of material 20 application may decrease and still provide adequate control for the sheet material 20. As the width of the sheet material 20 and/or length of the burnish 30 decrease, the user has greater control over the application of the sheet material 20 for steering and accommodating arcs or a curvilinear path as the sheet material 20 is applied.

For the embodiment described herein, a two-ply polymeric sheet material 20 having a removable PET carrier sheet having a width of approximately 30.5 cm, and a burnish 30 having a length of at least about 3.8 cm has been found suitable. The burnish 30 is provided with a stiff felt pile.

While an applicator 10 having two burnishes 30 is generally illustrated in the figures, one of skill will realize the invention is not so limited. The applicator 10 may have three or more burnishes 30. For example, each of the first and second burnishes 30 could be subdivided, with appropriate convex angles, into two or more burnishes 30. The subdivision could yield burnishes 30 which comprise any combination of flat, curvilinear, or other suitable first surfaces 31 thereon. It is only necessary that the angular relationship of the burnishes 30 be maintained so that the applicator 10 may conveniently apply the free end of the sheet material 20 into a corner or other desired starting point on the substrate.

If desired, the applicator 10 may further comprise a level. The level may be disposed on the frame 12, the holder 14, or some other part of the applicator 10, as desired. The level may be utilized to indicate horizontal orientation, vertical orientation, a 45° orientation, any intermediate orientation, or a combination thereof. A simple bubble level and/or laser level may be utilized, as is known to one of ordinary skill.

It is desirable that the applicator 10 be able to terminate application of the sheet material 20 at a predetermined position. For example, the user may wish to terminate application of the sheet material 20 when it reaches the bottom of a wall, baseboard, edge of a table, etc. Thus, it is desirable that the applicator 10 be able to cut the sheet material 20 to a desired length and to do so at a desired position.

To assist in cutting the sheet material 20 to the desired length and postion, the applicator 10 may further comprise a knife 34, such as a blade, cutting wheel, hot wire, heated edge, etc. to assist in removing the sheet material 20 from the applicator 10. The knife 34 may be mounted to the holder 14, frame 12, a combination thereof, or another component on the applicator 10. While it is generally preferred that cutting occur parallel to the width of the sheet material 20, the direction of cut may be skewed relative to the width of the sheet material 20, and need not be straight. A jagged or curvilinear cut may occur, if desired. Alternatively, the sheet material 20 may be removed from the applicator 10 by simply being of definite length, as occurs when the sheet material 20 is precut to a desired size, by tearing at perforations, etc.

In an exemplary embodiment, the knife 34 is mounted to the frame 12 and bilaterally traverses a track 38 so that cutting may occur in either direction across the width of the material 20. In a particularly preferred embodiment, the knife 34 may retract from the direction of cutting of the sheet material 20 at each end of the track 38. Preferably, in such an embodiment, the ends of the track 38 are outboard of the sheet material 20 as taken in the width direction. If desired, the knife 34 may be biased so that it retracts automatically at either, and preferably both, ends of the track 38. Biasing may be done by a spring, gravity influence, cam action, magnetic attraction, etc.

One of skill will recognize that the sheet material 20 may be adhesively coated on the side which contacts the substrate. This provides for convenient application of the sheet material 20 to the substrate. Alternatively, the adhesive may be activated by water or other chemicals during application to the substrate, may be a pressure sensitive adhesive or thermally activated adhesive, and/or may be separately applied at the point of use, as are known in the art. In yet another embodiment, the sheet material 20 may have a carrier strip disposed on one side, as is known in the art. The carrier strip is removed upon application of the sheet material 20 to the substrate. If desired, the applicator 10 may further comprise a take-up roll for convenient spooling of the carrier strip as it is removed from the sheet material 20. The take-up roll may be biased to maintain tension of the carrier strip as it is wound thereon.

If an embodiment utilizing a carrier film and sheet material 20 is selected, preferably the burnish 30 provides for extended contact of the sheet material 20 and carrier film upon application to the substrate. Contrary to the knife edge attempts in the art described above, Applicants have found that extended contact of the burnish 30 in the direction of application of the sheet material 20 and carrier film prior to separation of the carrier film from the sheet material 20, improves the tracking and positioning of the sheet material 20 on the substrate. A coextensive distance of at least 2.5 cm, and more preferably at least 3.8 cm, as taken in the application direction, has been found to work well for application of the carrier strip and sheet material 20 to the substrate.

The sheet material 20 may have a predetermined length, such as occurs when the sheet material 20 has lines of weakness such as perforations, cuts, etc. Alternatively, the length of the sheet material 20 may be indeterminate, as occurs when a quantity of the sheet material 20 is applied to the substrate and cut at a desired position. The desired position may occur at a midpoint on the substrate, when an end of the substrate is reached, etc.

If desired, the applicator 10 and sheet material 20 may be supplied as a kit. The kit may include one or more applicators 10, and one or more quantities of sheet material 20 usable with the applicator 10. This arrangement provides the advantage that the user has the applicator 10 for extended and multiple uses, and can replenish the sheet material 20 as needed. The sheet material 20 can be replenished when it is exhausted, or when different colors, sizes, thicknesses, protective qualities, or other properties of the sheet material 20 are desired. Each different type or sheet material 20 can be used with a single applicator 10. The applicators 10 may be differently sized, to handle greater or lesser quantities of the same sheet material 20, may be proportioned to accommodate sheet materials 20 of greater thicknesses, stiffnesses, etc.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An applicator for applying a sheet material to a substrate, said applicator comprising a holder for receiving a quantity of sheet material, said holder being disposed on a frame and at least two burnishes joined to said frame, wherein at least a portion of said frame is movable relative to the holder, and each said burnish comprises an outwardly facing first surface for burnishing said sheet material, said two burnishes being disposed so that said first surfaces subtend an included angle of at least 180°, at least one said burnish being flat, and having a generally planar outwardly oriented first surface having a length and width, whereby said first surface of said burnish can contact said sheet material throughout said length and width of said generally planar first surface while said applicator is in use.

2. An applicator according to claim 1 having a major axis, wherein each said burnish is flat and has a length and a width, said length being taken parallel to said major axis, whereby said applicator can be rotated about said major axis while in use so that each said flat burnish sequentially contacts said sheet, in turn, throughout said length and width, in order to burnish said sheet against a substrate.

3. An applicator according to claim 2, wherein said burnishes may be extrapolated to intersect at a vertex, each said burnish being offset from said vertex.

4. An applicator according to claim 2, wherein said burnishes comprise mutually different materials.

5. An applicator according to claim 3, wherein said first surfaces of said burnish subtend an included angle of at least 270°.

6. An applicator according to claim 1, wherein said burnishes subtend an included angle of less than 180° opposite said first surfaces, and said holder is disposed within said included angle of less than 180°.

7. An applicator according to claim 6, wherein said burnishes and said holder are elongate, and said aperture defines an elongate slit, said slit being disposed above one said burnish when said one burnish is disposed against a vertical substrate.

8. An applicator according to claim 1, wherein said at least one burnish comprises a compliant material.

9. An applicator according to claim 8, wherein at least one said burnish comprises felt.

10. An applicator for applying a sheet material to a substrate, said applicator comprising at least two burnishes, each said burnish comprising an outwardly facing first surface for burnishing said sheet material, said two burnishes being disposed so that said first surfaces subtend an included angle of at least 180°, at least one said burnish being flat, and having a generally planar outwardly oriented first surface having a length and width, whereby said first surface of said burnish can contact said sheet material throughout said length and width of said generally planar first surface while said applicator is in use, wherein said applicator is disposable against a flat substrate, said applicator further comprising a control bar for attachment to a sheet material, said control bar being movable between an deployed position and a retractable position, whereby said control bar is juxtaposable with a corner formed by said substrate when said control bar is extended to said deployed position.

11. An applicator for applying a sheet material to a substrate, said applicator comprising a holder for receiving a quantity of sheet material, said holder being disposed on a frame and two non-rotatable burnishes joined to said frame, wherein at least a portion of said frame is movable relative to the holder, and at least one said burnish has an arcuate and outwardly facing first surface for burnishing said sheet material onto the substrate, said other burnish also having an outwardly facing first surface, whereby both of said first surfaces can burnish said sheet material while said applicator is in use, said first surfaces of said burnishes being disposed in convex noncoplanar relationship relative each other, wherein said applicator comprises two burnishes, at least one of said burnishes having a first surface which is convexly shaped, each said burnish having a major axis, said applicator having a hinge generally parallel to said major axis, at least one said burnish being articulable relative to the other said burnish about said hinge.

12. An applicator for applying a sheet material to a substrate, said applicator comprising two non-rotatable burnishes, at least one said burnish having an arcuate and outwardly facing first surface for burnishing said sheet material onto the substrate, said other burnish also having an outwardly facing first surface, whereby both of said first surfaces can burnish said sheet material while said applicator is in use, said first surfaces of said burnishes being disposed in convex noncoplanar relationship relative each other, wherein said applicator comprises two burnishes, at least one of said burnishes having a first surface which is convexly shaped, each said burnish having a major axis, said applicator having a hinge generally parallel to said major axis, at least one said burnish being articulable relative to the other said burnish about said hinge, wherein said first surfaces of said two burnishes comprise mutually different materials.

* * * * *